United States Patent [19]

Aaron

[11] Patent Number: 4,979,326

[45] Date of Patent: Dec. 25, 1990

[54] BAIT HOLDER

[76] Inventor: James C. Aaron, 117 I-L-A Handcock Dr., Social Circle, Ga. 30279

[21] Appl. No.: 483,873

[22] Filed: Feb. 23, 1990

[51] Int. Cl.$^5$ ............................................. A01K 97/00
[52] U.S. Cl. ......................................................... 43/4
[58] Field of Search .............................. 43/4, 55, 54.1

[56] References Cited

U.S. PATENT DOCUMENTS

| | | | |
|---|---|---|---|
| 2,518,590 | 8/1950 | Andrist | 43/4 |
| 2,531,551 | 11/1950 | Brecht et al. | 43/4 |
| 2,885,814 | 5/1959 | Schlador | 43/4 |
| 2,929,166 | 3/1959 | Sneide | 43/4 |
| 3,164,067 | 1/1965 | Hurst | 43/4 |
| 3,271,890 | 9/1966 | Davis | 43/4 |
| 3,308,570 | 3/1967 | Horton | 43/4 |
| 3,964,204 | 6/1976 | McKinley | 43/4 |
| 3,975,853 | 8/1976 | Aaron | 43/4 |
| 4,118,807 | 10/1978 | McCauley | 43/4 |

Primary Examiner—Richard K. Seidel
Assistant Examiner—Rex E. Pelto
Attorney, Agent, or Firm—Thomas & Kerr

[57] ABSTRACT

A bait holder (10) for use in impaling bait with a fish hook includes a cover (11) having an opening (12) formed therein. A flexible, fabric panel (21) is adjustably attached at first and second portions to the cover to define a bait holding chamber (22). Tongs (26) are movably positioned partly within the bait holding chamber (22) for movement between a first position in which a bait gripping portion (36, 37) of the tongs is positioned adjacent the opening (12) in the cover and a second position in which the tongs extend outwardly through an open end of the bait holding chamber to position the bait gripping portion externally of the bait holding chamber, as for grasping and retrieving bait.

11 Claims, 1 Drawing Sheet

BAIT HOLDER

TECHNICAL FIELD

The present invention generally relates to fishing tackle, and more particularly to a device for holding bait to facilitate impaling the bait with a fishing hook.

BACKGROUND OF THE INVENTION

When a fisherman puts bait on his hook, it is desirable to place the hook accurately in the bait so that the hook does not tear out during casting or reeling. Furthermore, the inadvertent placement of the hook in certain locations in live bait can decrease the effectiveness of the live bait by needlessly limiting its movements or by causing its premature death. Accurate placement of the hook in live bait can be impeded by the bait moving about rapidly, thereby making it difficult to hold, which also increases the danger that the fisherman will accidentally hook himself. This problem is made worse when the bait itself poses a hazard to the fisherman, as for example when the bait has sharp fins, spines or teeth.

Additionally, in some circumstances it may be desirable to avoid direct contact with the bait. For example, some people when fishing might have the manual dexterity to impale the bait accurately with a hook, but for one reason or another find handling bait with their hands unpleasant or offensive. Also, human skin contains oils which can be deposited on the bait by direct handling and these oils might decrease the effectiveness of the bait.

Accordingly, it is seen that a need exists for a device which aids in the accurate placement of a hook in bait, minimizes the danger of the fisherman hooking himself or the bait injuring the fisherman, and minimizes direct contact between the fisherman's hands and the bait. It is to the provision of such therefore that the present invention is primarily directed.

SUMMARY OF THE INVENTION

Briefly described, in a preferred form the present invention comprises a bait holder for use in impaling bait with a fish hook and includes a cover having an opening formed therein. A flexible member, such as a fabric panel, is attached at first and second portions thereof to the cover to define a bait holding chamber having at least one open end and a second end remote therefrom. Tongs are movably positioned partly within the bait holding chamber and extend out from the second end for movement between a first position in which a bait gripping portion of the tongs is positioned adjacent the opening in the cover and a second position in which the tongs extend outwardly through the open end of the bait holding chamber to position the bait gripping portion externally of the bait holding chamber.

With this construction, the tongs can be moved to the second position so that the bait gripping portion of the tongs is external of the bait holding chamber and the tongs can be manipulated to grasp bait remotely. The tongs can then be withdrawn to the first position to move the bait adjacent the opening in the cover to allow the bait to be impaled with a hook. The fisherman can then squeeze the flexible fabric panel to grip the bait safely while avoiding direct contact with the bait.

Thus it is an object of the present invention to provide a device which aids in the accurate placement of a hook in bait.

It is another object of the invention to provide a safe means of impaling bait with a hook.

It is a further object of the invention to provide a means for minimizing direct human contact with bait when impaling the bait with a hook.

Other objects, features and advantages of the present invention will become apparent upon reading the following specification in conjunction with the accompanying drawing figures.

BRIEF DESCRIPTION OF THE DRAWING FIGURES

DETAILED DESCRIPTION

Figure 1:
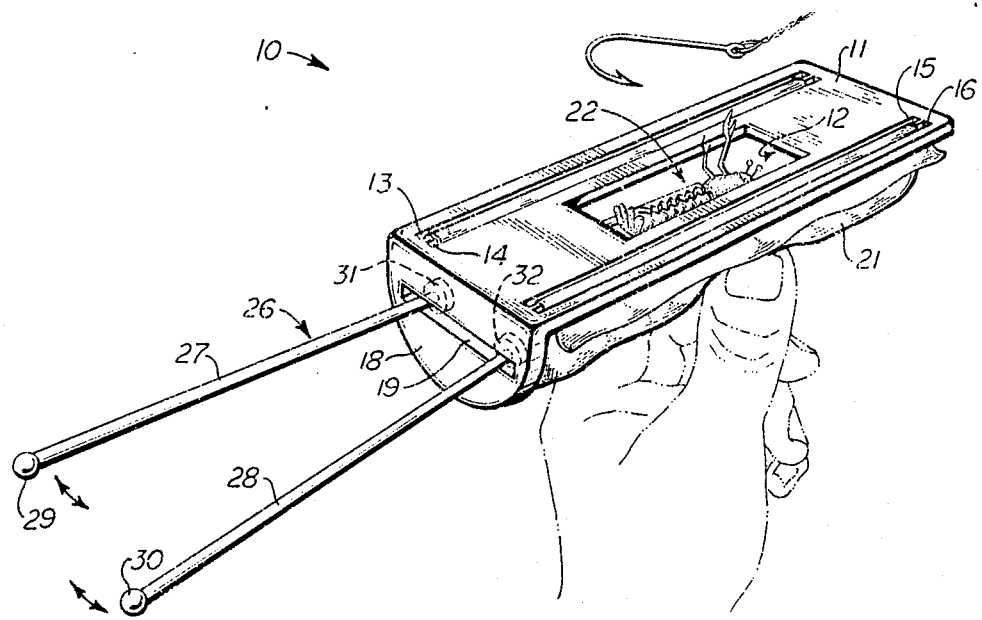
FIG. 1 is a perspective illustration of a bait holder according to the present invention in a preferred form, showing the bait holder being used to aid in impaling bait with a hook.
Figure 2:
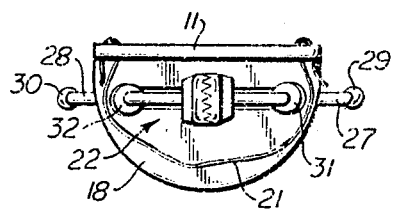
FIG. 2 is a front elevation view of the bait holder of FIG. 1.
Figure 3:
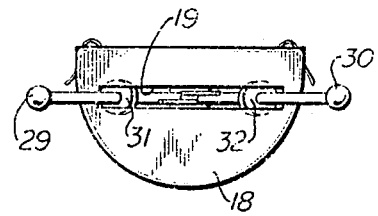
FIG. 3 is a rear elevation view of the bait holder of FIG. 1.
Figure 4:
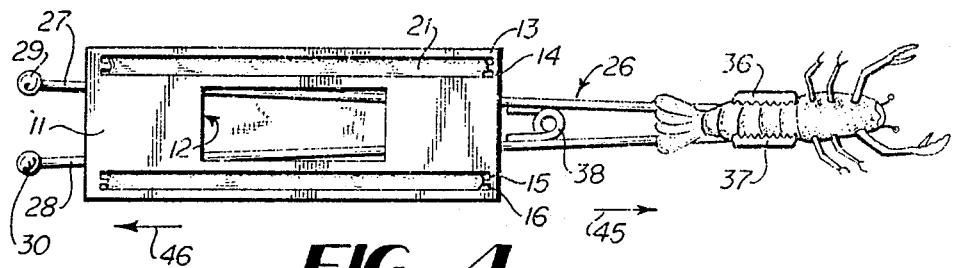
FIG. 4 is a plan view of the bait holder of FIG. 1, showing the bait holder with the tongs in the second position being used to grasp and retrieve bait.

Referring row in more detail to the drawing figures, in which like reference numerals represent like parts throughout the several views, FIGS. 1–4 show a bait holder 10 according to the present invention in a preferred form. Bait holder 10 comprises a rigid upper cover or panel 11 which is of rectangular configuration. The cover 11 includes a rectangular central opening 12 which is sized to allow bait to pass therethrough. A pair of elongated slot-like openings 13 and 14 extend along the length of the cover adjacent one edge thereof and a similar pair of elongated slot-like openings 15 and 16 are formed along a second edge of the cover.

A semicircular end panel 18 is attached to one end of the upper cover 11. The end panel 18 includes an elongated slot like opening 19. Both the end panel 18 and the upper cover 11 can be made from wood, plastic or suitable lightweight metal.

A flexible member 21 is attached to the upper cover 11 by threading the flexible member through the slot-like openings 13, 14, 15 and 16. The flexible member 21 and the upper cover 11 form a variable size bait holding chamber indicated generally at 22. The size of this chamber can be adjusted by increasing or decreasing the amount of the flexible member which extends between the slots 14 and 15. This is accomplished simply by pulling on the middle portion of the flexible member to increase the volume of the chamber or by pulling on an end portion of the flexible member to decrease the volume. The adjustable nature of the size of the bait holding chamber 2 allows the bait holder 10 to be used effectively with different size bait. The flexible mexer is preferably made of a cloth fabric, and to minimize direct human contact with the bait can be made of a waterproof or water repellant material. The fabric is highly, flexible so that gripping of the bait as shown in FIG. 1 is not made difficult.

Figure 5:
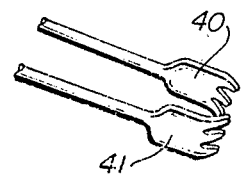
FIG. 5 is a perspective illustration of a portion of the bait holder of FIG. 1 in a second preferred form.

Bait gripping means or tongs 26 are movably mounted within the bait holding chamber 22 and extend out from the bait holding chamber and through the slot-like opening 19 formed in the end panel 18. The tongs 26 include first and second handle portions 27 and 28 which are movably received within the slot 19. The handles 27 and 28 carry end stops 29 and 30 formed on the ends of each of the handles which prevent the tong handles from being inserted completely through the slot 19. A second pair of stops 31 and 32 are positioned on the handles 27 and 28 for preventing the tongs from passing entirely through the slot 19 in the opposite direction and for assisting in positioning the bait immediately below opening 12. The stop elements 29-32 tend to help keep the various parts of the bait holder all together. The tongs 26 include a pair of bait grasping jaws 36 and 37 facing each other which are spring biased toward each other by a spring 38. Alternatively, as shown in FIG. 5, the jaws 36 and 37 can be replaced with fork-like elements 40 and 41.

OPERATION

The bait holder 10 may be used as follows. The fisherman grasps the upper cover 11 with one hand and pushes the tongs 26 with the other hand in the direction of arrow 45. (See FIG. 4) He then squeezes the tong handles 27 and 28 together to open the bait grasping jaws 36 and 37. After positioning the bait grasping jaws about a piece of bait, he then allows the spring 38 to close the jaws 36 and 37 about the bait to grasp it. He then withdraws the tongs and the bait in the direction of arrow 46 until the jaws 36 and 37 and the bait are accessible through the central opening 12. He then grips the bait and the jaws of the tongs by squeezing the fabric member 21 to grasp the bait and secure it in a stable position. With the other hand, he then impales the bait with a fishing hook, then relaxes his grip on the fabric member and squeezes the tong handles to release the hooked bait so that it may be removed from the chamber through opening 12.

The fabric member 21 prevents direct human contact with the bait and minimizes the danger of the fisherman accidentally hooking himself with the fishing hook. This is so because the tongs and the fabric panel make it easier to control slippery bait or live bait which is moving about. Containing the bait in this manner also has the advantage of avoiding injurious contact with teeth, fins or spines of the bait.

Using elongated tongs as shown in the figures allows one to pick bait out of a bait bucket remotely without reaching one's hand into the water of the bait bucket.

While the present invention has been described in a preferred form, it will be readily apparent to those skilled in the art that many additions, deletions and modifications may be made therein without departing from the spirit and scope of the invention as set forth in the following claims.

I claim:

1. A bait holder for use in impaling bait with a fish hook, said bait holder comprising a cover having an opening formed therein, a flexible member attached in overlying relationship with respect to said cover to define a bait holding chamber having a first open end and a second end remote from said first end, and elongated gripping means movably positioned partly within said bait holding chamber and extending outwardly from said second end for movement between a first position in which a bait grasping portion is positioned adjacent said opening in said cover and a second position in which said gripping means extend outwardly through said open end of said bait holding chamber to position said bait grasping portion externally of said bait holding chamber, whereby the gripping means can be moved to the second position so that the bait grasping portion of the gripping means is positioned externally of the bait holding chamber for grasping and retrieving bait, whereupon the gripping means can be withdrawn to the first position to position the bait adjacent the opening in the cover to allow the bait to be impaled with a hook.

2. A bait holder as claimed in claim 1 further comprising an end panel attached to said cover adjacent said second end of said bait holding chamber, said end panel having an opening through which said elongated gripping means movably extend.

3. A bait holder as claimed in claim 2 wherein said elongated gripping means comprise tongs having first and second elongated handles and wherein said opening in said end panel is generally slot-shaped.

4. A bait holder as claimed in claim 3 wherein at least one of said first and second elongated handles includes stop means for limiting the movement of said one elongated handle through said slot-shaped opening in said end panel.

5. A bait holder as claimed in claim 1 wherein said flexible member is made of fabric.

6. A bait holder as claimed in claim 5 wherein said flexible member is adjustably attached to said cover.

7. A bait holder as claimed in claim 6 wherein said flexible member is adjustably attached to said cover by said flexible member being threaded through parallel elongated openings formed in said cover.

8. A bait holder as claimed in claim 1 wherein said cover is rigid and said elongated gripping means comprises first and second gripping jaws which are spring-biased toward each other.

9. A bait holder for use in impaling bait with a fish hook, said bait holder comprising a rigid upper cover having an opening formed therein, a flexible member attached at a first portion to said rigid cover and adjustably attached at a second portion to said rigid cover to define a bait holding chamber of variable size, said bait holding chamber having a first open end and a second end remote from said first end, a rigid end panel attached to said cover adjacent said second end of said chamber and having a slot-shaped opening formed therein, and tongs movably positioned partly within said bait holding chamber and extending outwardly through said slot-shaped opening in said end panel for movement between a first position in which a bait grasping portion of said tongs is positioned adjacent said opening in said rigid cover and a second position in which said tongs extend outwardly through said first open end of said bait holding chamber to position said bait grasping portion externally of said bait holding chamber, whereby the tongs can be moved to the second position so that the bait grasping portion of the tongs is positioned externally of the bait holding chamber for grasping and retrieving bait, whereupon the tongs can be withdrawn to the first position to position the bait next to the opening in the cover to allow the bait to be hooked.

10. A bait holder as claimed in claim 9 further comprising stop means for limiting the movement of said tongs through said slot-shaped opening in said end panel.

11. A device for use in baiting fish hooks comprising a cover having an opening formed therein, a flexible member adjustably mounted to said cover, said cover and said flexible member defining a variable size bait holding chamber, bait gripping means movably mounted within said bait holding chamber for movement between a first position external of said bait holding chamber and a second position adjacent said opening in said cover, and means extending out from said bait holding chamber for manipulating said bait gripping means.

* * * * *